United States Patent

[11] 3,583,756

| | | |
|---|---|---|
| [72] | Inventor | Karl Wilfert<br>Gerlingen-Waldstadt, Germany |
| [21] | Appl. No. | 774,308 |
| [22] | Filed | Nov. 8, 1968 |
| [45] | Patented | June 8, 1971 |
| [73] | Assignee | Daimler-Benz Aktiengesellschaft<br>Stuttgart-Unterturkheim, Germany |
| [32] | Priority | Nov. 11, 1967 |
| [33] | | Germany |
| [31] | | D54585 |

[54] BODY END PIECE FOR MOTOR VEHICLES
20 Claims, 10 Drawing Figs.

[52] U.S. Cl. .................................................. 296/31,
293/63, 293/71
[51] Int. Cl. ..................................................... B62d 25/08
[50] Field of Search .......................................... 296/28, 31,
31 P; 293/63, 69, 71; 52/656, 660, 664

[56] References Cited
UNITED STATES PATENTS

| | | | |
|---|---|---|---|
| 2,329,874 | 9/1943 | Cadwallader................ | 180/69X |
| 2,531,967 | 11/1950 | Bishop.......................... | 293/71 |
| 2,793,971 | 5/1957 | Collins et al. ................ | 296/31(P) |

FOREIGN PATENTS

| | | | |
|---|---|---|---|
| 1,019,798 | 11/1952 | France ......................... | 180/69 |
| 821,254 | 10/1959 | Great Britain................ | 293/63 |

Primary Examiner—Benjamin Hersh
Attorney—Craig, Antonelli, Stewart & Hill

ABSTRACT: A body end piece for motor vehicles, especially for passenger motor vehicles which consists of an annularly-shaped base body made from rubber or synthetic resinous material, preferably foamed synthetic resinous material; the base body corresponds substantially to the width and height of the body end and is secured at a fixed part of the vehicle.

INVENTOR
KARL WILFERT

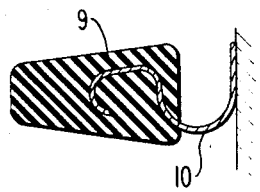
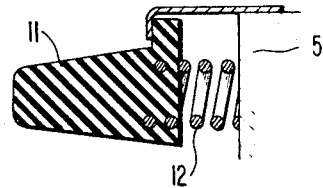
FIG.5  FIG.6
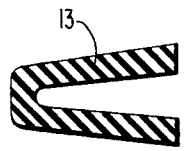
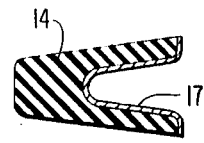
FIG.7  FIG.8
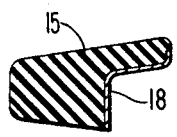
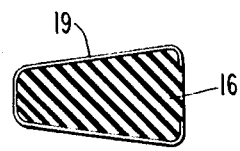
FIG.9  FIG.10
INVENTOR
KARL WILFERT
BY
Craig & Antonelli
ATTORNEYS

BODY END PIECE FOR MOTOR VEHICLES

The present invention relates to a body end piece for motor vehicles, especially for the front end of passenger motor vehicles.

The known vehicle body end pieces have the disadvantage that they are damaged already during very minor accidents so that they have to be exchanged frequently in order not to impair the optical overall impression of the motor vehicle.

The present invention aims at eliminating this disadvantage and to create a vehicle end piece which absorbs elastically the impacts acting on the same in case of minor accidents. The present invention essentially consists in that the body end piece consists of an annularly shaped base body made from rubber or synthetic resinous material, preferably from foamed synthetic resinous material of any conventional type, which corresponds essentially to the entire width and height of the vehicle end and which is secured at the superstructure of the motor vehicle. The term "superstructure" is used in this specification and in the appended claims to refer to those relatively fixed parts of the vehicle such as frame, subframe or corresponding parts of a self-supporting-type vehicle body which perform a support function and to which the end piece of the vehicle body can be secured.

Advantageously, the base body can be reinforced by metal parts, preferably by a metal frame. The base body can be provided with preferable horizontally extending lamellae which cover off the air inlet apertures at the body end.

In an extraordinarily advantageous manner, the base body can be secured at the superstructure by way of elastically or plastically deformable members. In a structurally simple manner, the elastically or plastically yielding members may be embedded partially in the base body.

According to a further feature and development of the present invention, the base body may be provided with holders, sockets or bases for individual lights or light units.

The base body may be arranged separated from the outer panels of the body by a transverse joint or gap. Particularly advantageously, the base body may form together with the adjoining outer body panels of the body a gap or joint at the end face of the vehicle.

Accordingly, it is an object of the present invention to provide a vehicle body end piece for motor vehicles which eliminates by simple means the aforementioned shortcomings and drawbacks encountered in the prior art.

Another object of the present invention resides in a vehicle end piece for motor vehicles which is able to elastically absorb impacts acting on the same during minor accidents.

Another object of the present invention resides in a body end piece for motor vehicles which is simple in construction, can be easily manufactured and readily installed as well as interchanged.

These and further objects, features, and advantages of the present invention will become more obvious from the following description when taken in connection with the accompanying drawing which shows, for purposes of illustration only, several embodiments in accordance with the present invention and wherein:

FIGS. 5 and 6 are somewhat schematic partial cross-sectional views illustrating two types of fastening and securing possibilities in accordance with the present invention; and FIGS. 7 through 10 are somewhat schematic partial cross-sectional views through further modified embodiments of the base body for the cord piece in accordance with the present invention.

Figure 1:
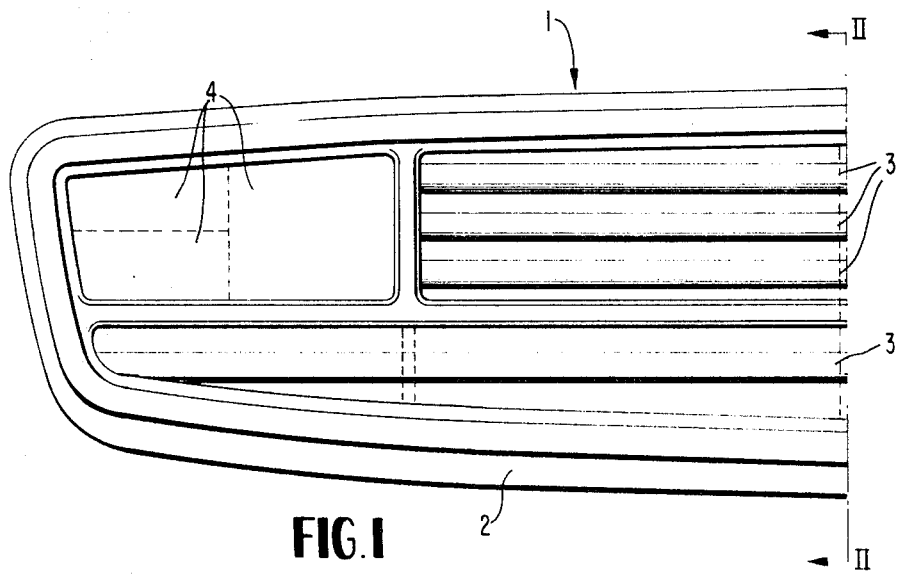
FIG. 1 is a partial elevational view, taken in the direction of the vehicle longitudinal axis, on a body end piece in accordance with the present invention.

Referring now to the drawing wherein like reference numerals are used throughout the various views to designate like parts, and more particularly to FIG. 1, the body end or head piece illustrated in this figure and generally designated therein by reference numeral 1, consists essentially of an annularly shaped base body 2 which is preferably made from synthetic resinous material, in particular from foamed synthetic resinous material of any conventional type. The body end piece 1 which is arranged at the body end, is provided with horizontally extending lamellae 3 which cover the inlet apertures at the body end. Additionally, the body end piece 1 is provided with sockets 4 or bases for the installation of individual lights or light units.

The body end piece 1 is secured at the superstructure 5 of the motor vehicle and is separated from the adjoining outer body panel 6 of the body by a transverse gap or joint 7.

Figures 2, 3, 4:
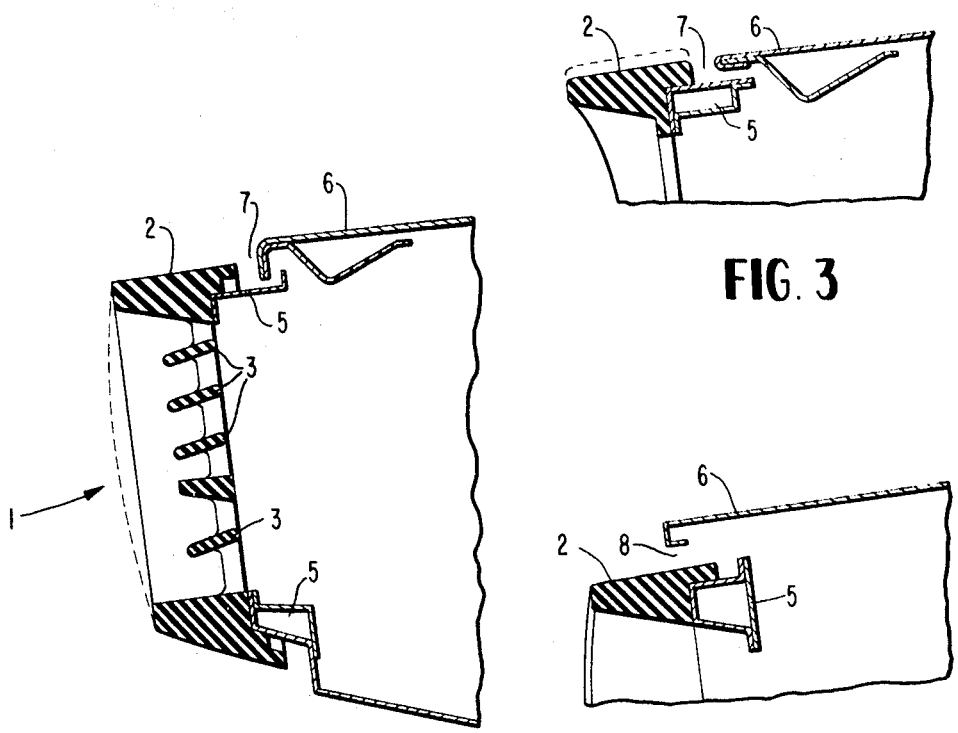
FIG. 2 is a cross-sectional view through the body end piece of FIG. 1, taken along line II—II.
FIG. 3 is a partial cross-sectional view, similar to FIG. 2, of a modified embodiment of the body end piece in accordance with the present invention.
FIG. 4 is a partial cross-sectional view, similar to FIG. 3, through a further modified embodiment of a body end piece in accordance with the present invention.

As illustrated in FIGS. 2 and 3, the vehicle end piece can thereby be secured at the superstructure 5 at a distance from the outer panel 6 of the body, for example, of an engine or luggage hood, or, as illustrated in FIG. 4, may be arranged in an aperture of the body end so that it forms a gap 8 at the end face with the outer panel 6 of the body.

Plastically deformable deformation members 10 may be embedded in the annularly shaped base body 9 during manufacture, for example, during molding—as illustrated in FIG. 5—by means of which the body end piece is secured at the superstructure of the motor vehicle. The part of the deformation member 10 arranged inside of the annularly shaped base body 9 serves for the reinforcement of the body end piece. In a similar manner, a metallic part of any suitable configuration which is constructed as reinforcing frame may be arranged within the annularly-shaped base body 9 in that it is molded into the base body during the manufacture thereof. In a manner similar to deformation member 10 corresponding to FIG. 5, springs 12 (FIG. 6) may be embedded in the annularly shaped base body 11 by means of which the body end piece is springily supported at the superstructure 5 of the motor vehicle.

As illustrated in FIGS. 7 to 10, the annularly shaped base body of the body end piece may have different cross-sectional shapes. It may consist, for example, of an approximately U-shaped body 13 (FIG. 7) which has approximately the same cross section at all places. However, it is advantageous if the annularly shaped base body 14, 15 or 16 is reinforced by individual metal parts 17, 18 or 19, respectively, which may be emplaced, may clampingly surround or may be inserted into the same (FIGS. 8, 9 and 10). The individual metal parts 17, 18 and 19 may be replaced each in an extraordinarily advantageous manner by a metal frame that extends continuously about the entire circumference of the base body. As shown in FIGS. 8 and 9, the annularly shaped base body 14 or 15 may be placed over a metal part 17 or 18, respectively, or over a metal frame of any desired cross-sectional shape. An extraordinarily advantageous type of construction is achieved if, as illustrated in FIG. 10, the metal parts 19 or the metal frame clampingly surround the annularly shaped base body 16.

While I have shown and described only several embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are within the scope of those skilled in the art.

I claim:

1. A body end piece for motor vehicles, having a superstructure, especially for the front end of passenger motor vehicles, characterized by an annularly shaped base body means made from a foamed synthetic resinous material, said base body means corresponding approximately to the entire width and height of the corresponding body end and being secured at the superstructure of the vehicle, further comprising metallic reinforcing means for reinforcing the base body means, wherein said base body means is provided with lamellae means covering inlet apertures at the body end.

2. A body end piece according to claim 1, wherein said reinforcing means are formed by metallic parts.

3. A body end piece according to claim 1, wherein said reinforcing means are formed by a metallic frame.

4. A body end piece according to claim 1, wherein said lamellae means extend essentially horizontally.

5. A body end piece according to claim 1, wherein the base body means are deformable members.

6. A body end piece according to claim 5, wherein said deformable members are elastically deformable members.

7. A body end piece according to claim 5, wherein said deformable members are plastically deformable members.

8. A body end piece according to claim 5, wherein the deformable members are partially embedded in the base body means.

9. A body end piece according to claim 8, wherein said deformable members are elastically deformable members.

10. A body end piece according to claim 8, wherein said deformable members are plastically deformable members.

11. A vehicle end piece according to claim 8, wherein the base body means is equipped with socket means for vehicle lights.

12. A body end piece according to claim 11, wherein the lights are individual lights.

13. A body end piece according to claim 11, wherein the lights are light units.

14. A body end piece according to claim 8, wherein the base body means is equipped with base means for vehicle lights.

15. A body end piece according to claim 8, wherein the base body means is arranged separated from adjacent outer body panels of the body by a transverse gap.

16. A body end piece according to claim 8, wherein the base body means forms with the adjoining outer panels of the body a gap at the end face.

17. A body end piece for motor vehicles, having a superstructure, especially for the front end of passenger motor vehicles, characterized by an annularly shaped base body means made from a foamed synthetic resinous material, said base body means corresponding approximately to the entire width and height of the corresponding body end and being secured at the superstructure of the vehicle, wherein said base body means is provided with lamellae means which extend essentially horizontally for covering inlet apertures at the body end.

18. A body end piece for motor vehicles, having a superstructure, especially for the front end of passenger motor vehicles, characterized by an annularly shaped base body means made from a foamed synthetic resinous material, wherein the base body means corresponds approximately to the entire width and height of the corresponding body end and is secured at the superstructure by way of deformable means partially embedded in the base body means, said base body means being provided with lamellae means covering inlet apertures at the body end.

19. A vehicle end piece for motor vehicles having a superstructure, especially for the front end of passenger motor vehicles, characterized by an annularly shaped base body means made from a foamed synthetic resinous material, said base body means corresponding approximately to the entire width and height of the corresponding body end and being secured at the superstructure of the vehicle, wherein the base body means is equipped with socket means for vehicle lights and is provided with lamellae means covering inlet apertures at the body end.

20. A body end piece for motor vehicles, having a superstructure, especially for the front end of passenger motor vehicles, characterized by an annularly shaped base body means made from a foamed synthetic resinous material, said base body means corresponding approximately to the entire width and height of the corresponding body end and being secured at the superstructure of the vehicle, wherein the base body means is arranged separated from adjacent outer body panels of the body by a transverse gap and is provided with lamellae means covering inlet apertures at the body end.